United States Patent [19]

Lieberman

[11] Patent Number: 4,512,084
[45] Date of Patent: Apr. 23, 1985

[54] PICTURE HANGING MARKER

[76] Inventor: Steven Lieberman, 17 Sunset Dr., Bedford Hills, N.Y. 10507

[21] Appl. No.: 570,077

[22] Filed: Jan. 11, 1984

[51] Int. Cl.$^3$ ................................................. G01B 3/02
[52] U.S. Cl. ...................................... 33/180 R; 33/189
[58] Field of Search ............. 33/180 R, 181 R, 185 R, 33/189

[56] References Cited

U.S. PATENT DOCUMENTS

| | | | |
|---|---|---|---|
| 3,516,165 | 6/1970 | Pfeffer | 33/189 |
| 3,530,591 | 9/1970 | Moffit | 33/180 R |
| 4,241,510 | 12/1980 | Radecki | 33/180 R |
| 4,382,337 | 5/1983 | Bendick | 33/180 R |
| 4,473,957 | 10/1984 | Faulkner | 33/180 R |

*Primary Examiner*—Willis Little
*Attorney, Agent, or Firm*—Mandeville & Schweitzer

[57] ABSTRACT

The disclosure is directed to a wall marker for marking a desired location on a wall for a support arranged to mount an object. The wall marker generally comprises a suction cup means, a marking means mounted upon the suction cup means and arranged to extend within the confines of a central concave portion of the suction cup means and means associated with the suction cup means and the marking means to retain the marking means in a normally spaced relation from the wall upon which the suction cup means is adhered to. In accordance, an important feature of the invention, the marking means is selectively axially displaceable relative to the suction cup means whereby the marking means may be selectively displaced into contact with the wall to create a visible mark on the wall. The wall mark of the invention also includes a support mounting means mounted on the suction cup means whereby an object holder such as a painting hanger may be temporarily secured to the wall by the suction cup means to temporarily mount a painting or other object to the wall. If the painting is hanging in a desired position, the painting and picture hanger may be removed from the suction cup means and the pin marking displaced to create a mark on the wall. The suction cup may thereafter be removed from the wall and the painting may be mounted to the location indicated by the mark created by the marking means.

8 Claims, 10 Drawing Figures

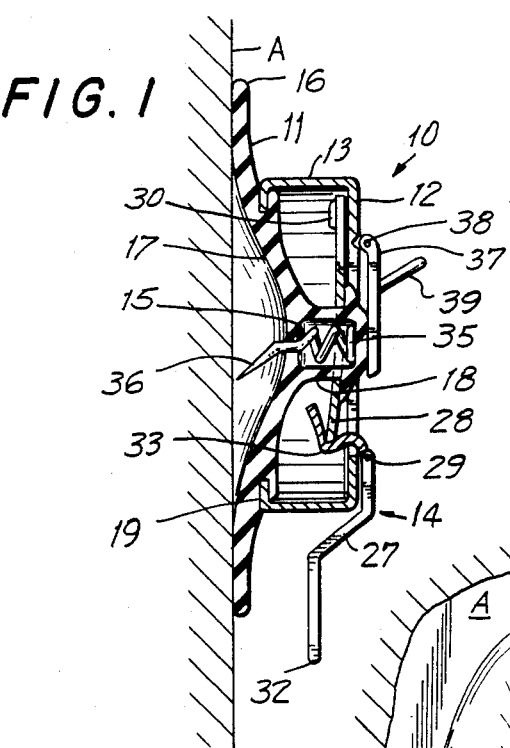
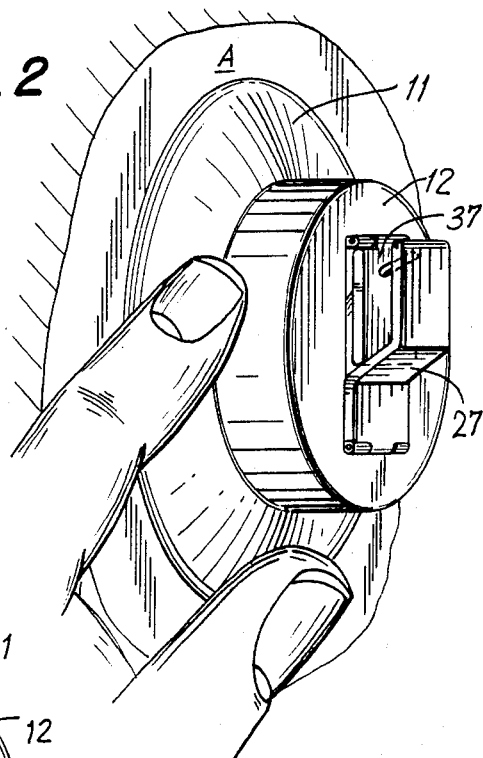
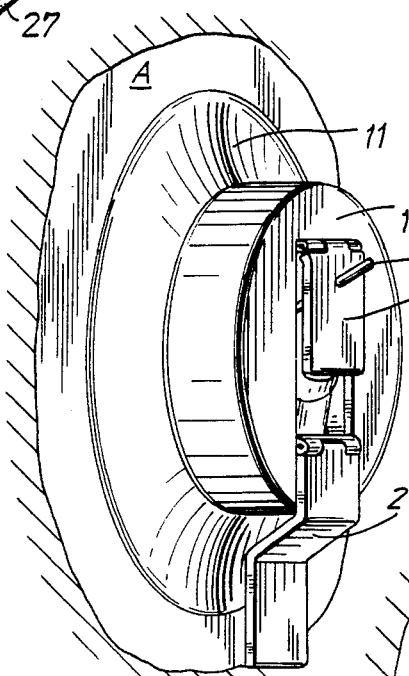
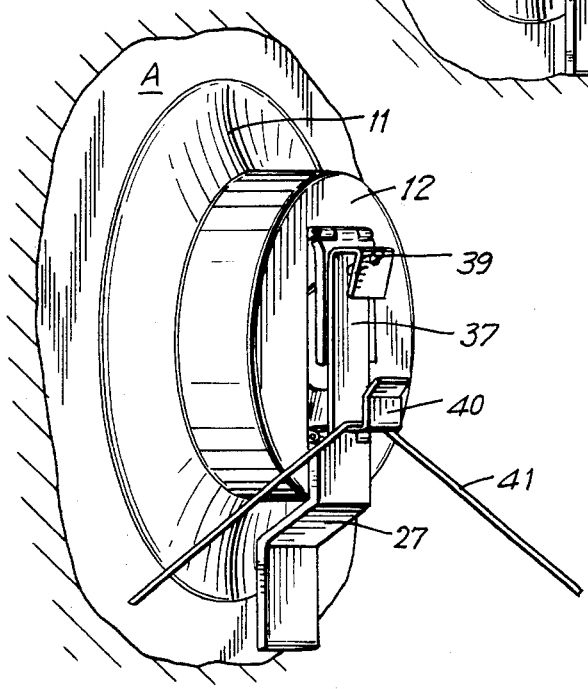
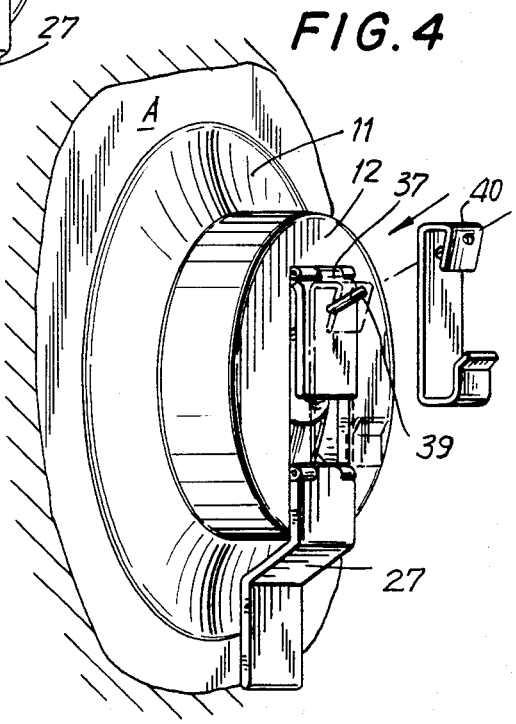

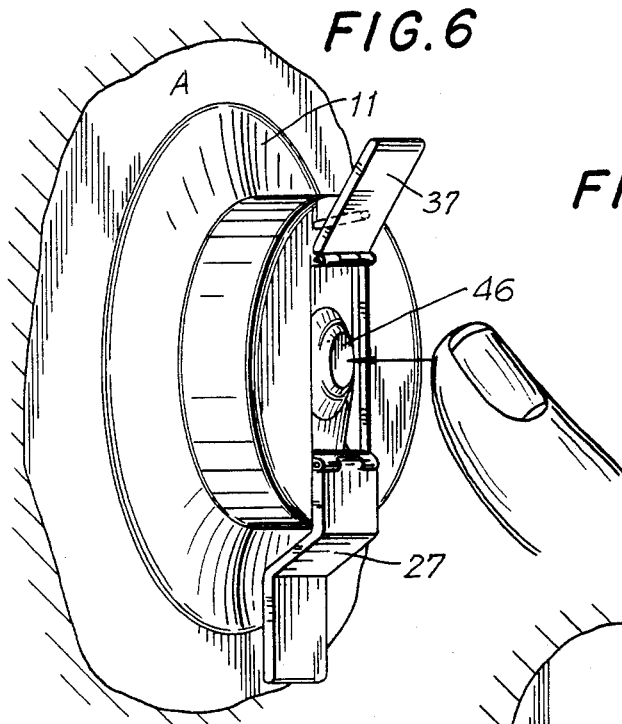
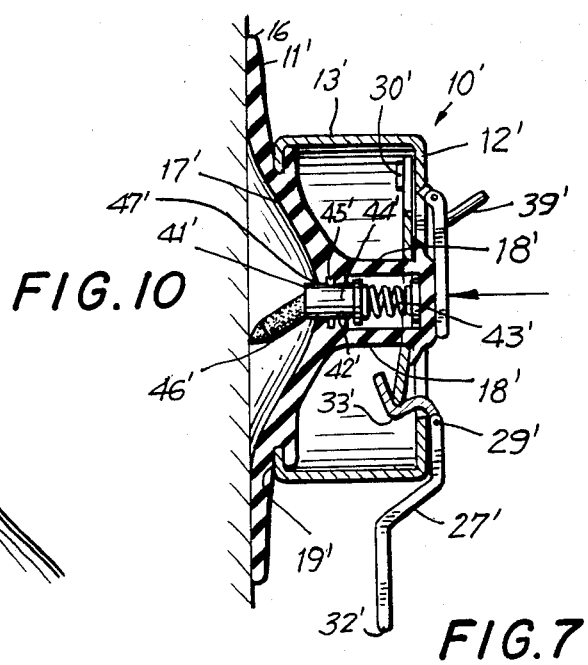
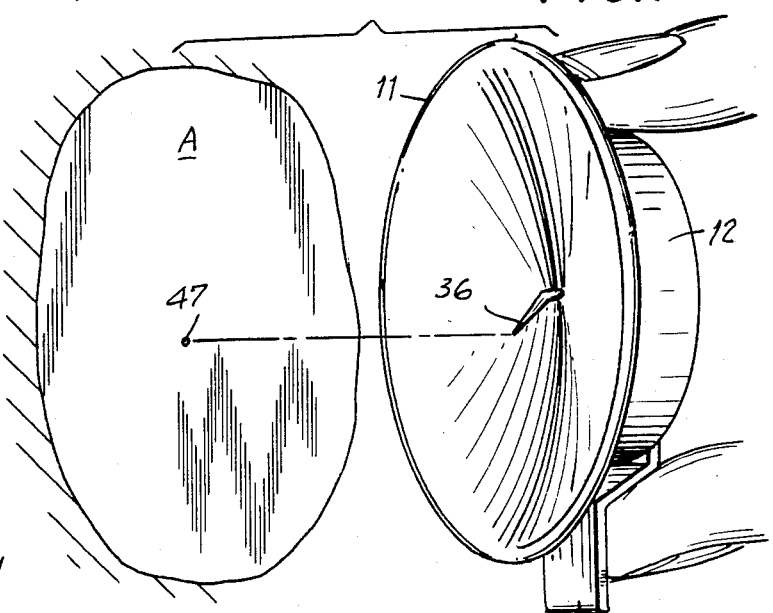
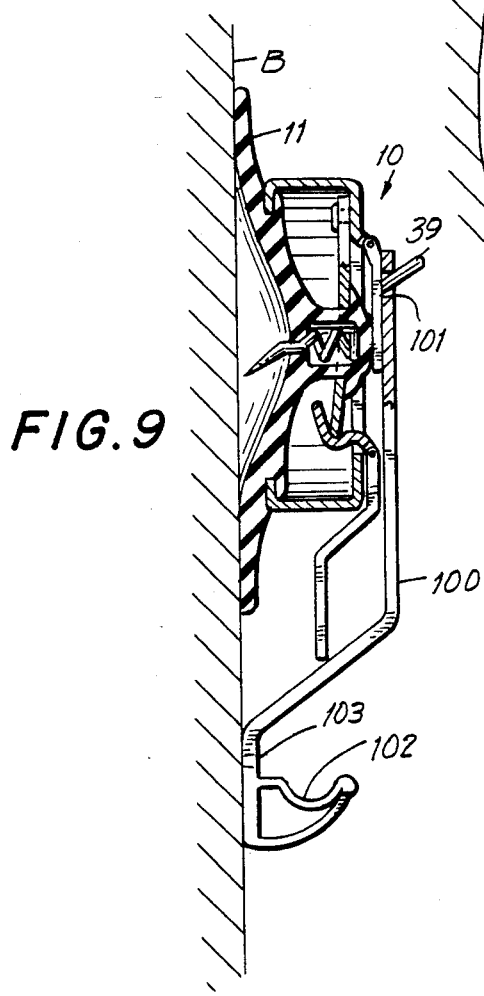
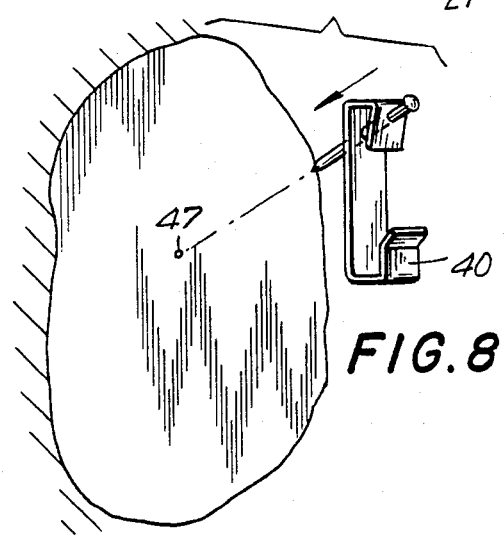

PICTURE HANGING MARKER

BACKGROUND OF THE INVENTION

Hanging a painting, mirror, curtains, or other objects upon a wall in the proper location can be a time-consuming and frustrating process. Whether a single person is trying to hang the picture, or two or more people are working together, it can be almost impossible to determine the proper position for the support which will hold the painting, e.g., the proper position for the picture hanger. One person, working alone, will have to repetitively nail the picture hanger to the wall, hang the picture upon the picture hanger and stand back to observe the effect. Invariably, the first position is not the desired position and the picture will have to be removed and remounted into a second location. Each time this happens, however, the hole from the nail is left in the wall. This positioning and repositioning is frequently necessary even when the exact location for the picture is known, since the effect of the picture wire in distorting the position of the painting is difficult to compensate for without trial and error.

If two people are working together to hang a painting on a wall, the process becomes even more complicated, with one person being initially the holder and the other the observer, and the two exchanging places. Since it is frequently desirable to have the painting exactly positioned in order to blend with other artwork on the wall or, e.g., to precisely align curtains on curtain rod supports, the number of holes in the wall created by this trial and error process can become quite large. Even then, the procedure may have become so frustrating that the painting is left to hang in a spot that is not quite right, but at least is bearable.

It is, therefore, desirable to have a device which would enable someone to hang the painting in various positions on the wall without marking the wall, and yet which would create a single mark upon the wall in the unique desired location.

SUMMARY OF THE INVENTION

Such an extremely useful device comprises the subject matter of the present invention. More specifically, the present invention comprises a wall marker which may be repositioned many times upon a wall without creating any mark, which will support both the picture hanger and the painting in any location upon the wall, and which will create a visible mark upon the wall for the permanent position of the picture hanger only when such permanent position has been determined.

It will be understood, of course, that the novel wall marker of the present invention may be used to position supports other than picture hangers and objects other than paintings, but for simplicity of description these terms will usually be used. Other particular uses of the novel wall marker are presented in specific detail later.

Generally, the novel wall marker of the invention includes a suction cup means for holding the entire wall marker and a painting temporarily upon the wall. On the suction cup means are the following elements:

a booster arm mechanism to assist in providing sufficient suction force to hold the device in position, a support mounting means for mounting the picture hanger upon the wall marker, and a marking means. The marking means may advantageously comprise a pin or ink marker, which normally would be spaced from the wall when the wall marker is mounted on the wall, but which may be pressed against the wall to create a visible mark. The marking means is so aligned with the support mounting means that the visible mark created on the wall is positioned so as to allow the painting to be permanently mounted in a desired position.

Pursuant to a significant feature of the invention, the wall marker may include a removable marker means whereby either a pin or a felt-type ink marker may be selectively installed in the wall marker. In this manner, the device of the invention may be used on any type of wall surface including plaster board, wood, metal, marble, glass, etc. The pin marker may be used on wall surfaces which are easily penetrated, e.g., plaster board and wood, whereas the felt-type ink marker may be used on hard, difficult to penetrate wall surfaces such as metal and marble. The suction cup may also be made to include any form of well known suction force adjustment means to vary the suction force of the cup as required by the weight of the object to be mounted.

A novel and advantageous method for using this wall marker is also disclosed, comprising the steps of positioning the novel marker on the wall, engaging the suction booster arm, mounting the picture hanger upon the mounting means, hanging the painting upon the picture hanger, and engaging the marker means to create the visible mark when the position of the painting as it appears supported by the wall marker is acceptable. Since the marking means is activated only when the position is acceptable, only one mark will be created.

For a more complete understanding of the invention, reference should be made to the following detailed description of a preferred embodiment of the invention and to the accompanying drawings.

BRIEF DESCRIPTION OF THE DRAWINGS

FIG. 1 is a side cross-sectional view of the novel wall marker of the present invention as it would appear when mounted on a wall.

FIG. 2 is a perspective view of the wall marker in use in the initial step of the novel method of the present invention.

FIG. 3 is a perspective view of the wall marker in use in the second step of the novel method of the present invention.

FIG. 4 is a perspective view of the wall marker in use in the third step of the novel method of the present invention.

FIG. 5 is a perspective view of the wall marker in use in the fourth step of the novel method of the present invention.

FIG. 6 is a perspective view of the wall marker in use in the fifth step of the novel method of the present invention.

FIG. 7 is a perspective view of the wall marker in use in the sixth step of the novel method of the present invention.

FIG. 8 is a perspective view of the seventh step of the novel method of the present invention.

FIG. 9 is a side cross-sectional view of the novel wall marker mounted on a wall and including a curtain rod hanger.

FIG. 10 is a side cross-sectional view of another embodiment of the wall marker of the invention as it would appear when mounted on a wall.

DETAILED DESCRIPTION OF A PREFERRED EMBODIMENT OF THE INVENTION

The novel wall marker 10 of the present invention is advantageously embodied in a suction cup means 11 and a frame 12, as seen in FIG. 1. The suction cup means 11 is seen in side cross-sectional view, as it would appear when mounted on a wall A. The frame 12 comprises a support mounting means 13 and a booster arm mechanism 14. As seen in FIG. 1, the suction cup means 11 has the conventional configuration of a circular outer lip 16 and a circular concave portion 17. Extending outwardly from the circular concave portion 17 in a hollow central column 18, which supports within itself a marking means 15. The suction cup means 11 is formed from a standard resilient material suitable for forming an airtight seal with the wall A. The frame 12 provides the wall marker 10 with suitable rigidity and strength to support the object, e.g., a painting, to be hung. The frame 12 comprises a cup shaped element including a circumferentially extending lip 19 received in a slot formed on the suction cup means 11 to mount the frame 12 to the suction cup means 11.

In accordance with the invention, the booster arm mechanism 14 comprisses a hinged booster lever 27, having a bent configuration, and a booster spring 28. The booster lever 27 is rotatably mounted to the support frame 12 by means of a hinge 29 and the booster spring 28 is mouned within the frame 12 by means of a pin 30. The booster lever 27 has an outer bent handle portion 32 and an inner bent working portion 33, which are integrally formed as a single lever. The lever 27 is rotatable about the hinge 29 downwardly to bring the working portion 33 into working engagement with the end of the booster spring 28, to thereby move the booster spring 28 away from the wall A. This action causes the suction cup means 11 to adhere to the wall A, as will appear.

Within the central column portion 18 is the marking means 15. The marking means 15 may advantageously be embodied in a spring 35 including an integral marking pin means 36 extending inwardly and adapted to be selectively placed into contact with the wall A. In the preferred embodiment, the marking pin means 36 is used to create a pinhole in the wall A at the proper location for the support, but only after such proper location has been determined.

To mount the wall marker 10 upon the wall A, the suction cup means 11 is positioned on the wall A in a position that is as close as possible to a desired location (FIG. 2). The suction cup means 11 is then depressed against the wall in a manner conventional for mounting a suction cup upon a wall. Pursuant to the invention, the rigid frame 12 prevents the central concave portion 17 which directly surrounds the marking means 15 from being pressed so closely to the wall A that the marking pin 36 contacts the wall A. Instead, the outer lip portion 16 of the suction cup means 11 is depressed until it is essentially in flat contact with the wall A (FIG. 1). The booster lever 27 is then moved from its released position (FIG. 2) into its engaged position, (FIG. 3) forcing the booster spring 28 away from the wall A to thereby urge the central column 18 and the central concave portion 17 of the suction cup means 11 away from the wall A. By this action, the volume of the space between the suction cup means 11 and the wall A is increased without the addition of air, thereby increasing the suction force from the exterior air pressure holding the suction cup means 11 against the wall A. The booster lever 27, in its engaged position, is maintained in this engaged position until it is manually returned to the released position. During this process, the marking pin 36 has never been allowed to move closer to the wall A than the height of the side of the support 12 and, therefore, the marking pin 36 has never come in contact with the wall A. By this means, the wall marker 10 may be mounted at many different positions on the wall without marking the wall. To release the wall marker 10, the booster lever 27 is returned to its released position (FIG. 2) and the suction cup means 11 is simply lifted from the wall A.

The support frame 12 includes a mounting strip 37 rotatably mounted thereon by means of a hinge 38. Extending outwardly from the mounting strip 37 is a mounting means, in the illustrated embodiment advantageously being in the form of a rod means 39. A conventional picture hanger 40 such as the one illustrated in FIGS. 4, 5, and 8, may be supported by the rod means 39 after the suction cup 11 is secured to the wall A. This particular embodiment of the wall marker 10 is particularly adapted to receive this type of picture hanger, or any other type of hanger which is supported by a nail. It is contemplated, however, that the support mounting means may appear in any appropriate configuration for mounting a particular hanger without departing from the scope of the invention. The rod means 39 of the illustrated embodiment is located on the mounting strip 37 and overlies the central column portion 18. The rod means 39 is aligned with the marking means 15 to insure that the mark on the wall to be made by the pin 36 properly identifies the desired location.

The rod means 39 is also advantageously positioned so that the booster lever handle 32, when in the released position, overlies and shields the rod means 39, as may be seen most clearly in FIG. 2. By this means, the potentially dangerous narrow rod means 39 is not exposed until the marker 10 is adhered to the wall A and in a position to mount the picture hanger 40.

When the wall marker 10 has been mounted upon the wall, by the method discussed above, and the booster arm lever 27 has been moved into the engaged position, the rod means 39 is exposed. At this point, the picture hanger 40 or other support may be placed (FIG. 4) upon the rod means 39. The painting to be hung (illustrated by a conventional, well-known picture wire 41) is then mounted upon the hanger 40 in the conventional manner (FIG. 5). The wall marker 10 is held to the wall by sufficient suction force to support most paintings and mirrors, e.g., up to 50 pounds. Should it be desired to support heavier objects, of course, larger or more powerful suction cup means may be employed without departing from the scope of the invention.

With the painting upon the wall, it may be viewed from a distance. If the painting is not in a desired position, the painting is removed from the picture hanger, which, in turn, is removed from the rod means. The booster arm means is then flipped to its released position, and the wall marker 10 moved to another position on the wall A. Up to this point, no mark has been created on the wall.

If the painting is hanging in a desired position, the marking procedure is as follows: the painting and picture hanger 40 are removed from the rod means 39, and the marking strip 37 is rotated upwardly (FIG. 6), to expose a pin marker pad 46, which lies over the central column portion 18. The pin marker pad 46 is then depressed towards the wall by a finger, causing the pointed end of the marking pin 36 to move into contact with the wall A and thereby create a pinhole mark. The wall marker is then dismounted from the wall (FIG. 7) and the picture hanger 40 is affixed to the wall at the position of the pinhole 47 (FIG. 8). Accordingly, the present invention provides a highly effective means for mounting an object upon a wall in a desired position without creating excessive markings on the wall. Moreover, the invention facilitates the picture hanging process in that a person may conveniently mount a picture in several different positions by means of the wall marker of the invention before deciding upon the permanent mounting position.

Referring now to FIG. 9, there is illustrated the marker 10 as utilized to temporarily mount a curtain rod hanger 100. In all respects, the marker 10 is identical to the marker 10 illustrated in FIG. 1. Moreover, the marker 10 illustrated in FIG. 9 is mounted to a wall surface B in the same manner as described above with respect to the mounting of the marker to the wall A. The curtain rod hanger 100 is of a bent configuration whereby when an opening 101 formed at the top end of the hanger 100 is received over the mounting rod 39 of the marker 10, the rod support portion 102 of the curtain rod hanger 100 will abut against the wall surface B at a position below the suction cup means 11. Of course, it should be understood that two markers 10 with curtain rod hangers 100 are to be adhered to the wall B at spaced positions such that a curtain rod may be held between the two rod support portions 102 of the rod hangers 100 in a well-known curtain rod support arrangement.

After the curtain rod (not specifically illustrated) is supported by the marker 10, rod hanger 100 arrangement described above, a person may view the position of the rod. If the position of the rod is acceptable, the person may use a pencil to mark the locations of the rod support portions 102, and thereafter remove the curtain rod and markers 10 from the wall B.

To facilitate the pencil marking, a hole 103 may be formed through the hanger 100 at a position corresponding to the position on the actual rod hanger to be mounted wherein the nail receiving hole is formed. The pencil mark would then be made through the hole 103 to properly indicate the mounting position for the rod holder. There will then be a set of visual marks on the wall B to indicate where the permanent rod hangers are to be mounted.

Referring now to FIG. 10, another embodiment of the wall marker of the invention is provided with a removable marker. In all respects, the marker 10' is substantially similar to the marker 10 illustrated in FIG. 1 with the exception of a removable wall marker assembly 41'. Thus, reference should be made to the detailed description of the embodiment illustrated in FIG. 1 for a complete description of the general construction and operation of the marker 10'. As noted above, the embodiment of the invention illustrated in FIG. 10 has been modified to include a generally circular opening 42' and a spring mechanism 43' mounted to the front wall of the central columm 18' of the suction cup means 11'. The removable wall marker assembly 41' generally comprises a body portion 44' including a pair of mounting pins 45' and a felt-type ink marker 46'. The body portion 44' is arranged to be received within the opening 42', whereby the pins 45' are received in axially extending slots 47'. In this manner, the body portion 44' may engage and be moved against the spring 43' until the engaging pins 45' are at the rearwardmost end portions of the slots 47'. The slots 47' are arranged in a L-shaped configuration whereby the body portion 44' may be rotated to displace the pins 45' into the L portions of the slots 47' to retain the wall marker assembly 41' within the opening 42'. Of course, the assembly 41' may be conveniently removed from the marker 10' by rotating the assembly 41' whereby the pins 45' are once again within the axially extending portions of the slots 47'. The wall marker 10' illustrated in FIG. 10 may be utilized in the same manner as the wall marker 10 illustrated in FIG. 1, to temporarily mount a painting and thereafter provide a visible mark on the wall surface to indicate the proper location for selectively mounting the painting. The felt tip ink type marker is ideal for use in connection with difficult to penetrate wall surfaces such as stone, metal, etc. Pursuant to the invention, various other removable wall marker assemblies may be provided to replace the felt-type ink marker illustrated in FIG. 10, when desirable. These additional wall marker assemblies will be of the same construction as the illustrated felt-type ink marker with the exception of the actual marking means. For example, the felt-type ink marker may be replaced by a pin marker of the type illustrated in the embodiment of FIG. 1. Thus, the marker assembly may be selectively removed and replaced to provide an actual marker means most suitable for the particular type of wall material upon which the painting is to be mounted.

It should be understood that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A wall marker for marking a desired location on a wall for a support for an object, said support being of the type which may be affixed to a wall and used to hold an object on said wall, said wall marker comprising
   (a) suction cup means,
   (b) said suction cup means having a central concave portion and an axially extending lip portion,
   (c) said lip portion being arranged and configured to uniformly contact said wall whereby said suction cup means forms an airtight seal with said wall when said suction cup means is placed against said wall,
   (d) said lip portion and said wall, when in contact, defining a plane of contact,
   (e) said central concave portion being arranged to face said wall when said suction cup means is in contact with said wall,
   (f) a marking means mounted upon said suction cup means and extending within the confines of the central concave portion of said suction cup means,
   (g) means associated with said suction cup means and said marking means to retain said marking means in a normally spaced relation to said plane of contact,
   (h) said marking means being selectively axially displaceable relative to said suction cup means whereby said marking means may be selectively displaced into contact with said wall to create a visible mark on said wall, and
   (i) a support mounting means mounted on said suction cup means.

2. The wall marker according to claim 1, further characterized by
   (a) said means associated with said suction cup means and said marking means comprising a rigid cup shaped element mounted upon said suction cup means,
   (b) said rigid cup shaped element being arranged relative to the central concave portion of said suction cup means whereby said rigid cup shaped element retains said central concave portion in a predetermined spaced relation to the wall when said suction cup means is placed against said wall.

3. The wall marker according to claim 1, further characterized by said marking means comprising a pin shaped element.

4. The wall marker according to claim 2, further characterized by a suction booster mechanism mounted on said rigid cup shaped element.

5. The wall marker according to claim 4, further characterized by
   (a) said suction booster mechanism including a lever rotatably mounted on said rigid cup shaped element and a compression strip mounted to said rigid cup shaped element and engaging said central concave portion,
   (b) said lever being arranged to engage and displace said compression strip to thereby urge the central concave portion away from the wall when the suction cup means is in contact with the wall.

6. The wall marker according to claim 2, further characterized by,
   (a) said central concave portion including a central column portion,
   (b) said marking means being mounted within said central column portion.

7. The wall marker according to claim 6, further characterized by
   (a) said marking means being selectively, removably mounted within said central column.

8. The wall marker according to claim 7, further characterized by
   (a) said marking means comprising a felt-type ink marker.

* * * * *